(12) United States Patent
Echigo et al.

(10) Patent No.: US 7,313,278 B2
(45) Date of Patent: Dec. 25, 2007

(54) CONTENT GENERATION, EXTRACTION AND DISTRIBUTION OF IMAGE REGION SEGMENTS FROM VIDEO IMAGES

(75) Inventors: Tomio Echigo, Yokohama (JP); Ken Masumitsu, Yamato (JP); Masayoshi Teraguchi, Yokohama (JP); Takaaki Murao, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 10/094,896

(22) Filed: Mar. 8, 2002

(65) Prior Publication Data

US 2002/0159637 A1 Oct. 31, 2002

(30) Foreign Application Priority Data

Mar. 16, 2001 (JP) ............................. 2001-076193

(51) Int. Cl.
G06K 9/46 (2006.01)
G06K 9/00 (2006.01)

(52) U.S. Cl. ....................................... 382/190; 382/103
(58) Field of Classification Search ...................... None
See application file for complete search history.

(56) References Cited

U.S. PATENT DOCUMENTS

| 5,099,322 | A | * | 3/1992 | Gove | 348/700 |
| 5,475,466 | A | * | 12/1995 | Iwasaki et al. | 396/153 |
| 5,586,063 | A | * | 12/1996 | Hardin et al. | 702/142 |
| 5,809,202 | A | * | 9/1998 | Gotoh et al. | 386/69 |
| 6,002,428 | A | * | 12/1999 | Matsumura et al. | 348/169 |
| 6,078,726 | A | * | 6/2000 | Gotoh et al. | 386/117 |
| 6,211,912 | B1 | * | 4/2001 | Shahraray | 348/228.1 |
| 6,389,168 | B2 | * | 5/2002 | Altunbasak et al. | 382/224 |
| 6,735,253 | B1 | * | 5/2004 | Chang et al. | 375/240.16 |
| 6,937,271 | B1 | * | 8/2005 | Mori et al. | 348/207.99 |
| 2002/0056131 | A1 | * | 5/2002 | Hayashi et al. | 725/115 |
| 2004/0113933 | A1 | * | 6/2004 | Guler | 345/716 |

OTHER PUBLICATIONS

Haridasan. R, Baras. J, "Scalable Coding of Video Objects", Proceedings of 1998 IEEE International Symposium on Circuits and System, May 31-Jun. 3, 1998, vol. 4, pp. 289-292.*

(Continued)

*Primary Examiner*—Bhavesh M Mehta
*Assistant Examiner*—Charles Kim
(74) *Attorney, Agent, or Firm*—Louis P. Herzberg

(57) ABSTRACT

The present invention provides methods for extracting an image region segment from a video image, a system for extracting an image region segment, a program for extracting an image region segment, a method for distributing an extracted video image, and a method for generating content. Motion compensation data is calculated using sequential video images captured by a video camera, and the sequential video images are employed to prepare an estimation of the video camera operation. Based on the estimated camera operation, the center position (xc, yc) of an area that is aimed at in a video image is estimated under predetermined conditions (rules), an image feature is designated in the vicinity of the center position of the target area, and an image segment is specified that includes this image feature.

4 Claims, 12 Drawing Sheets

OTHER PUBLICATIONS

Japanese Publication No. 08-130739 published on May 21, 1996.
Japanese Publication No. 2000-341613 published on Dec. 8, 2000.
Japanese Publication No. 04-281679 published on Oct. 7, 1992.
Japanese Publication No. 07-023322 published on Jan. 24, 1995.
Japanese Publication No. 09-326873 published on Dec. 16, 1997.
Japanese Publication No. 06-003726 published on Jan. 14, 1994.

Kato et al. "Study of the Camera Work of Broadcasting Cameramen While Shooting Moving Subjects," NHK Science and Technical Research Laboratories, Japan, Feb. 15, 1998, No. 48, pp. 34-47.

International Publication No. WO 01/41451 A1 published on Jun. 7, 2001.

* cited by examiner

A ⟶
Player while keeping control of a ball moves linearly and halts
Frame *i*     Frame *i+k*     Frame *i+n*
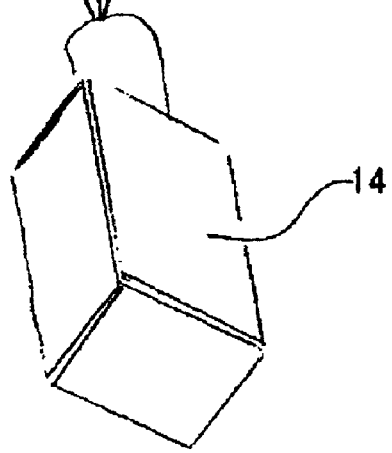
FIG. 2

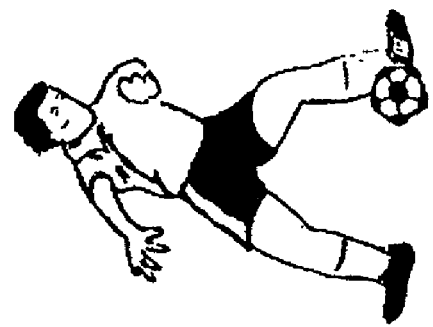
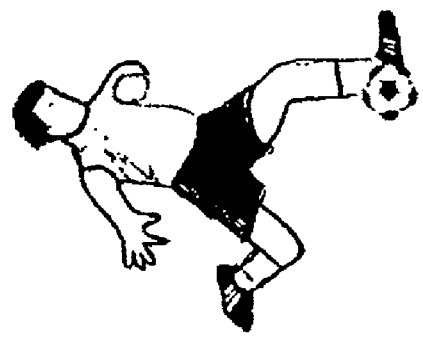
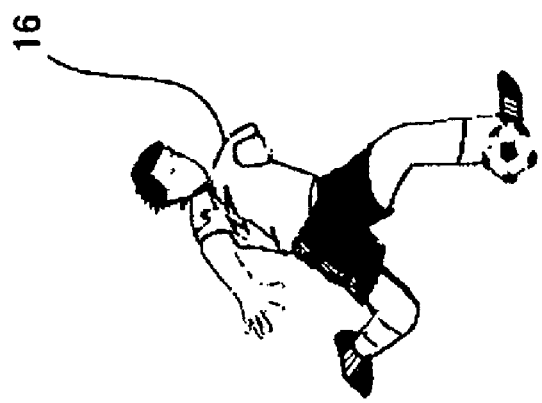
FIG. 3

```
define near_zero  3 //pixel
define no_acc     5
define acc_F      10
define acc_B      10
define thresh     5

//estimate position of target area of frame n
scalar = sqrt(Δx[n]*Δx[n]+Δy[n]*Δy[n])
if (scalar<=near_zero &&
    if(|Δx[i]-Δx[i+1]|+|Δy[i]-Δy[i+1]|<no_acc is statically established up to the immediately succeeding n+10 frames )
    then {the image center is the estimated value // (xc, yc)=(0, 0) }
} else if (scalar>=thresh) {
    if(|Δx[i]-Δx[i+1]|+|Δy[i]-Δy[i+1]| up to the immediately succeeding n+10 frames is equal to or greater than acc_F )
    then { (xc, yc)=( -(Δx[n]+Δx[n+10]), -(Δy[n]+Δy[n+10])) } // the sum of the current frame and
        10 succeeding frames is defined as the estimated value
    else
    if(|Δx[i]-Δx[i-1]|+|Δy[i]-Δy[i-1]| up to immediately preceding n-10 frames is equal to or grater than acc_B )
    then { (xc, yc) = ( -Δx[n] *( frame k is equal to or greater than n-acc_B )/10,
                        -Δy[n] *( frame k is equal to or grater than n-acc_B )/10 ) }
    else { // a front-space image is generated
        (xc, yc) = ( -Δx[n], -Δy[n] )
    }
} else {
    xc = average of Δx[i] from n-10 to n+10
    yc = average of Δy[i] from n-10 to n+10
}
```

Block A, Block B, Block C

FIG. 8

CONTENT GENERATION, EXTRACTION AND DISTRIBUTION OF IMAGE REGION SEGMENTS FROM VIDEO IMAGES

FIELD OF THE INVENTION

The present invention relates to a method and a system for extracting an image region segment for a video image and a program therefor, a method for distributing an extracted video image, and a content generation method.

BACKGROUND

Conventionally, a trimming image is generated by trimming a video image obtained by a video camera, and is used for various purposes. A video image is the view obtained by a cameraman with a video camera, the view from which the cameraman selects a target object consciously or subconsciously, and thus, according to specific empirical rules, determines the composition of the video image. In this case, the area that includes the object aimed at by the cameraman can be defined as the essential portion of a video image.

Discussions have been held concerning methods to be used for identifying, within a video image, an essential portion aimed at by a cameraman, and attempts have been made, including automating camera operations, to develop robot cameras that can automatically detect such a portion. Robot cameras have also been designed wherein sensors, for the detection of images, are provided that can pick up images when no cameraman is present. For this purpose, a method has been discussed whereby line of sight detection and the time-series measurement of camera operation can be used to analyze, for feedback to and control by a robot camera, animation characteristics that enable a cameraman to identify and focus on objects (e.g., "Analysis Of An Image Pickup Method Used By A Broadcast Cameraman When Recording A Moving Object", NHK Technical Institute R&D, No. 48, pp. 34-46, February 1998).

Further, a method, based on videos recorded using a fixed camera, has been proposed whereby a video that appears to have been directly recorded by a cameraman can be generated by using a digital camera, the operation of which mimics that employed by a cameraman ("Automated Video Generation Using A Digital Camera Operation", MIRU-2000, vol. I, pp. 331-336).

As a consequence of the development of portable computers and portable terminals, such as cellular phones, for which Internet connection service is provided, a system has been proposed for the distribution, as digital content, of various images. Furthermore, concomitant with the spreading use of the Internet, in addition to the above portable terminals, other computer systems, such as desktop computers or workstations, have come to be widely used for the distribution of images.

The size of image data is generally greater than that of either text data or of hypertext markup language (HTML) data, and since for portable computers or other portable terminals, such as cellular phones, the overhead for the delivery of image data tends to be excessive, memory resources for the downloading of data and for streaming are urgently required. This is especially true for cellular phones, the use of which is spreading, since the color liquid crystal displays mounted on these phones are too small to adequately display even reductions of images obtained using video cameras.

For portable terminals, the frame reproduction rate for video formats MPEG-2 and MPEG-4, both of which provide high compression and coding, is set at 15 frames per second. Thus, when a video image is distributed to a portable terminal, specifically because of a small screen size, a low resolution and a low frame rate, an image that is clearly visible in the original video may not be discernable on the screen. It has been especially pointed out that this inconvenient result will be outstanding for sports videos featuring rapid movement, and it is anticipated that viewing problems will occur in that the movement of objects, balls or players, will not be visualized and understanding of the contents of the video will be lost.

Thus, a demand exists for a process that will either extract only an area aimed at by a cameraman, which constitutes the essential portion of a video image, and enlarge the image sequence, or that will increase the resolution only of a target area while high compression scalable coding is performed for other portions, thereby enabling an image to be discerned, even on a portable terminal. To respond to this demand, it should be ascertained which area in a video image is targeted. However, since the point of aim may differ, depending on the cameraman, the uniform determination of target areas is difficult. Therefore, it is necessary to analyze a video image of a target area focused on by a cameraman, and to extract from the target area an object tracked by the cameraman who obtained the video. This is difficult, in that after a target area in a video image has been designated, an object in the target area should be extracted, i.e., it should be determined which of multiple objects in a video image a cameraman aimed at.

Thus, the removal, to the extent possible, of unnecessary portions of an obtained video image and the delivery to a portable terminal of only a predetermined area, including an object a cameraman was aiming at, are required, so that only a small amount of data are needed to deliver the essential portion of a video image that can be presented using a display having a limited area.

It is also necessary, to improve delivery and display speeds and to save on memory and network resources, for a video image for which trimming of the essential portion has been performed to be transmitted to computers.

In addition, especially for a portable telephone for which the display size and the memory resources are limited, efficient data distribution is required to enlarge only the essential portion of a video image.

SUMMARY OF THE INVENTION

To resolve the above shortcomings, one aspect of the present invention provides an image region segment extraction method, for a computer system and/or a network system, for extracting an image segment from a video image. The method comprises the steps of: calculating motion data for a video image based on sequential video images obtained by a video camera; using the sequential video images to estimate the camera operations required of the video camera; referring to the camera operations performed under predetermined conditions to estimate the location of the center of a target area in a video image that has been obtained; designating image features in the vicinity of the center position of the target area; and designating an image segment in which the image features are included.

According to another aspect of the invention, the video image is selected, at least from one of: an MPEG format, a CGM format, an EPS format, a GIF format, a JPEG format, a PICT format, a PNG format, a PS format, a TIF format and/or a BMP format. In addition, according to an example embodiment of the invention, the step of calculating the camera operations includes the step of: making an estimation of the robustness of a predetermined parameter of the camera operations. Further, in this invention, the image region segment extraction method comprises a step of obtaining an average movement for the predetermined parameter for two sequential frames.

Furthermore, according to another aspect of the invention, at the step of estimating the center position of the target area, a rule is employed concerning front-space video in the camera operations. In an example embodiment of this invention, advantageously, the image region segment extraction method further comprises the step of: trimming the image segment and generating a trimmed image; or performing scalable coding to obtain a high resolution for the image segment.

According to another aspect of the present invention, an image region segment extraction system, for a computer system, for extracting an image segment from a video image comprises: means for calculating motion data for a video image based on sequential video images obtained by a video camera; means for using the sequential video images to estimate the camera operations required of the video camera; means for referring to the camera operations performed under predetermined conditions to estimate the location of the center of a target area in a video image that has been obtained; means for designating image features in the vicinity of the center position of the target area; and means for designating an image segment in which the image features are included.

According to the present invention, the video image is selected, at least, from an MPEG format, a CGM format, an EPS format, a GIF format, a JPEG format, a PICT format, a PNG format, a PS format, a TIF format or a BMP format.

In addition, according to the invention, the means for calculating the camera operations includes: means for making an estimation of the robustness of a predetermined parameter of the camera operations. Further, in this invention, the image region segment extraction system comprises: means for obtaining an average movement for the predetermined parameter for two sequential frames.

Furthermore, according to the invention, it is advantageous that the means for estimating the center position of the target area employ a rule concerning front-space video in the camera operations to estimate the center position. In this invention, advantageously, the image region segment extraction system further comprises: means for trimming the image segment and generating a trimmed image; or means for performing scalable coding to obtain a high resolution for the image segment.

According to the present invention, an image region segment extraction program, for permitting a computer system to extract an image segment from a video image, comprises the steps of: calculating motion data for a video image based on sequential video images obtained by a video camera; using the sequential video images to estimate the camera operations required of the video camera; referring to the camera operations performed under predetermined conditions to estimate the location of the center of a target area in a video image that has been obtained; designating image features in the vicinity of the center position of the target area; and designating an image segment in which the image features are included.

According to another aspect of the invention, the video image is selected, at least, from an MPEG format, a CGM format, an EPS format, a GIF format, a JPEG format, a PICT format, a PNG format, a PS format, a TIF format or a BMP format. In addition, according to the invention, the step of calculating the camera operations includes the step of: making an estimation of the robustness of a predetermined parameter of the camera operations. Further, in this invention, the image region segment extraction program comprises a step of obtaining an average movement for the predetermined parameter for two sequential frames.

Furthermore, according to the invention, at the step of estimating the center position of the target area, a rule can be employed concerning front-space video in the camera operations. In this invention, advantageously, the image region segment extraction program further comprises the step of: trimming the image segment and generating a trimmed image; or performing scalable coding to obtain a high resolution for the image segment.

According to another aspect of the invention, a video image distribution method for distributing a video image via a network comprises the steps of: providing a server, connected to the network, for distributing video images to terminal means connected to the network; transmitting requests from the terminal means to the server for the distribution of the video image; and transmitting to the terminal means, in response to the request, a video image stored in the server, wherein the video image includes a trimmed image generated by the invention or an image obtained by scalable coding. In the invention, the terminal means is computer means connected to the network, or a cellular phone connected to the network.

According to the invention, a method for generating content, including trimmed images or scalable coded images, comprises the steps of: employing the method of the invention to generate trimmed images or scalable coded images; arranging the trimmed images in the order occupied by video images before trimming to constitute a continuous content time series; and storing the content in a storage media.

BRIEF DESCRIPTION OF THE DRAWINGS

These and other objects, features, and advantages of the present invention will become apparent upon further consideration of the following detailed description of the invention when read in conjunction with the drawing figures, in which:

FIG. 2 is a diagram showing the relationship between an object and the operation of a camera by a cameraman;

FIG. 3 is a diagram showing a frame time series for video image frames obtained by the operation of a camera in FIG. 2;

FIG. 8 is a diagram showing pseudocode used for the application of the rules in this invention;

DESCRIPTION OF THE SYMBOLS

Figure 1:
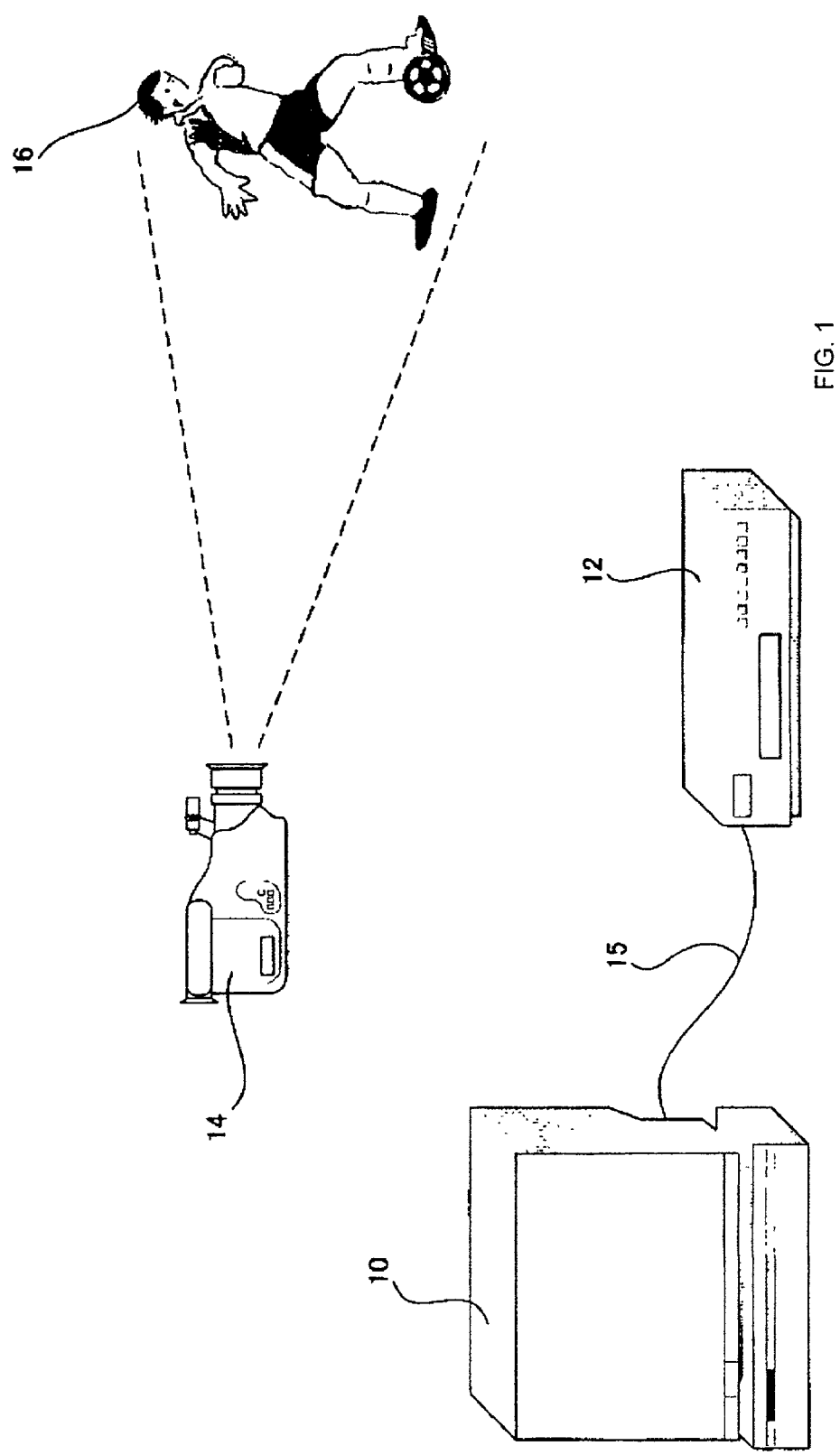
FIG. 1 is schematic diagram showing an image region segment extraction system according to the invention.

10: Computer
12: Video device
14: Video camera
15: Path
16: Soccer player
18: Display means
20: Target area
22: Trimmed image
24: Liquid crystal display
25: Server
26: Network
27: Carrier server
28: Second network
29: Mobile computer

DESCRIPTION OF THE INVENTION

An advantageous embodiment of the present invention will now be described while referring to the accompanying drawings. The present invention, however, is not limited to this embodiment.

FIG. 1 shows an example of a schematic diagram showing an image region segment extraction system according to the invention. The image region segment extraction system of this invention comprises: a computer 10, which includes a program for extracting an image region segment from a video image, and a video device 12, for transmitting the video image to the computer 10. The computers used for this invention can be personal computers or workstations, in which Pentium (a trademark of Intel Corp.) or PowerPC (a trademark of IBM Corp.) or compatible CPUs are mounted, that can execute Windows or Windows NT (a trademark of Microsoft Corp.), OS/2 or AIX (a trademark of IBM Corp.), or Unix or Linux operating systems. The personal computers or workstations that can be employed, however, are not limited to those corresponding to this description.

The video device 12 used for this invention reads, from a storage media, a video image obtained by image pickup means, such as a video camera 14 in FIG. 1. The video image is transmitted, via an appropriate path 15, to the computer 10, where it is analyzed and image segments are generated. In this invention, the storage media can be any well known storage media, such as a magnetic tape, an optical disk, a DVD or a memory card. The video image format used can be a digital file format such as MPEG (Moving Picture Experts Group), which includes the specific file formats MPEG-1, MPEG-2 and MPEG-4. In this invention, so long as means or a method is provided for extracting the same feature point for adjacent frames or the location to which a point is moved, i.e., means or a method for obtaining motion data that corresponds to motion compensation data included in a MPEG file, the present invention can be applied not only for the MPEG format, but also for any other known image format, such as a computer graphics meta file (CGM) format, an encapsulated postscript file (EPS) format, a graphic interface format (GIF), a JPEG format, a PICT (PCT) format, a portable network graphics (PNG) format, a postscript file (PS) format, a tag image file (TIF) format, or a bitmap (BMP) format.

In the embodiment in FIG. 1, the video device 12 and the video camera 14 are separately provided. The video camera 14 stores, on a storage media, video images of an object, such as a soccer player 16, that are captured by a cameraman. The video device 12 reads the video images from the storage media, reproduces or edits them, and then transmits them to the computer 10. In another example for the image region segment extraction system of this invention, a video image can be transmitted directly from the video camera 14 to the computer 10. In an additional example for the image region segment extraction system of this invention, the data can be exchanged by the video device 12 or the video camera 14 and the computer 10 via a network, without a storage media being used. In this example, a storage media on which video images are stored is not always required.

FIG. 2 shows an example of a diagram showing the relationship between the movement of an object and the operation of a camera when video images are captured by a cameraman. In FIG. 2, a soccer player 16, who is actively participating in a game, is employed as an object. Spatially, the soccer player 16 in FIG. 2 is moving from the left to the right, as indicated by an arrow A, in a soccer ball kicking time series. The video camera 14 in FIG. 2, which is being used to capture the images, is being panned by a cameraman (not shown) in the direction indicated by an arrow B, following the movement of the soccer player 16. In this manner, the soccer player 16 and his movement are recorded as a sequential video image time series.

FIG. 3 shows an example of a diagram showing the video image time series in frames obtained by the operation of the camera. As is shown in FIG. 3, for example, the soccer player 16 who has gained control of the soccer ball is recorded in frame i, the soccer player 16 who is dribbling the ball forward toward the goal of the opposing team is recorded in frame i+k, and the soccer player 16 who has stopped and is preparing to shoot is recorded in frame i+n. These frames correspond, for example, to a sequence shot at a pickup speed of 15 frames per second.

Figure 4:
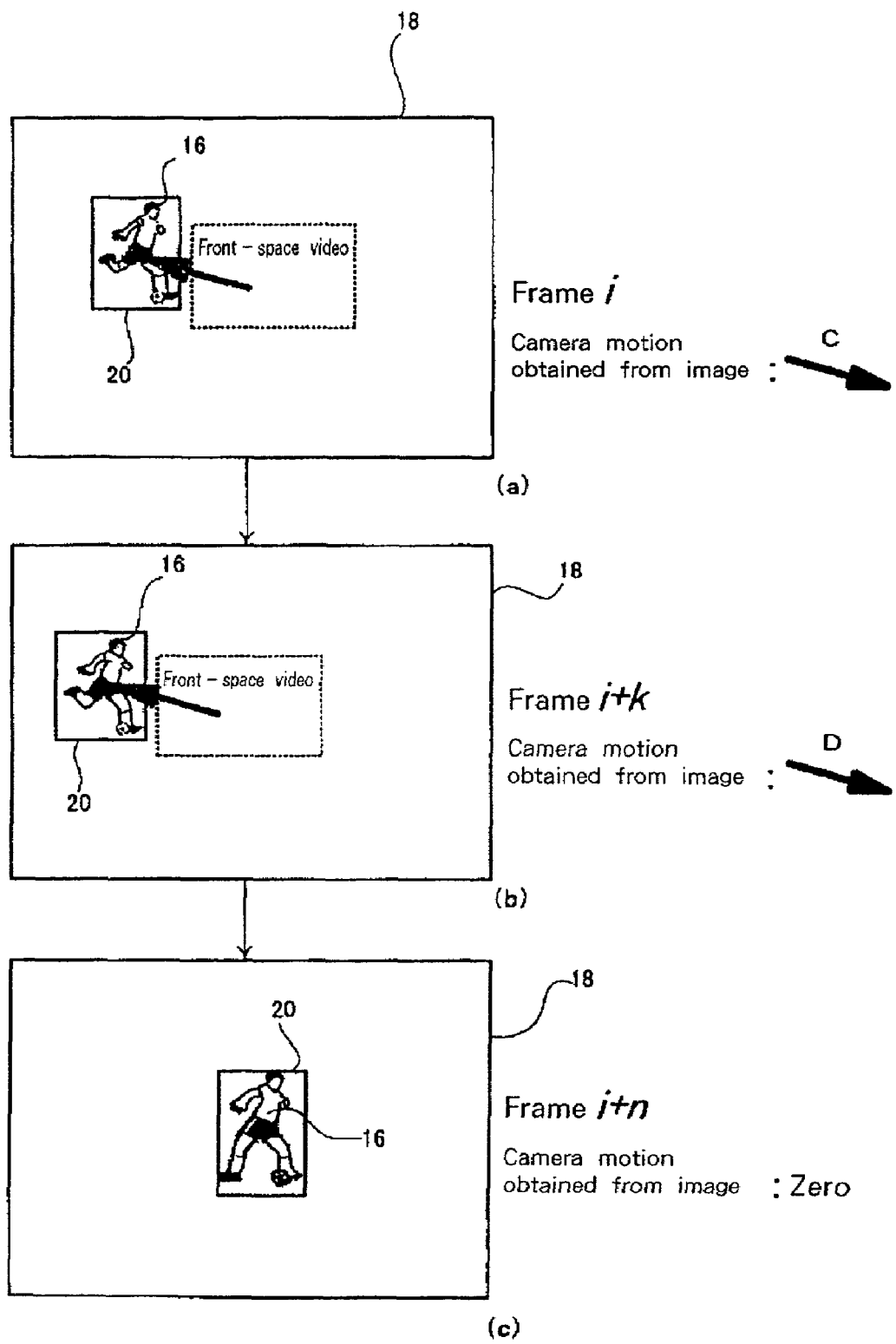
FIGS. 4A to 4C are diagrams showing relative locations of an object displayed on display means.

FIG. 4 shows an example of a diagram showing the relative positions of the soccer player 16, the object displayed by display means 18, such as a CCD display, captured by a video camera operated by a cameraman. Discussing the operation of the camera, the cameraman, specifically a professional cameraman having appropriate skills, sought in this instance to record as important content, in accordance with his experience or video philosophy, the video images in FIG. 4 by applying a predetermined rule calling for the tracking of a specific object aimed at in order to most effectively record the object.

A target video area is not always centrally located in an image, and is closely related to the operation of a camera and the size and the speed of an object. In general, rules for the operation of a camera are not clearly established; however, a professional, veteran cameraman unconsciously applies a method that ensures that an audience can easily perceive the video images that are picked up. In accordance with this method, specifically, while taking into account the fact that when a camera is panned to quickly to follow the rapidly changing movements of an object an audience may experience an uncomfortable feeling, an object may not be captured and recorded if a camera is panned too slowly, and that the optimal range provided for the operation of a camera places an object on a screen and follows its movements. This method is implemented for a so-called front-space video that is produced by allowing space in the direction of movement of a targeted object. Since for sale purposes most video images are obtained in accordance with the above rule, target areas that include objects can be extracted by identifying the areas or the objects in frames that were captured by cameras, and front-space videos can be produced by analyzing the operation of cameras.

Front-space video will now be further explained while referring to FIGS. 4A to 4C. In FIG. 4A, for frame i, the image of the soccer player 16 is displayed on the display means 18 of the video camera 14. A target area 20 is defined as a predetermined portion of the image that includes the soccer player 16. As is indicated by a broken line, a comparatively large space is obtained in the target area 20 in the direction of movement of the soccer player 16, and a front-space video is formed. In FIG. 4A, as the video camera is panned to follow the soccer player 16, who is moving from the left to the right, the direction in which the camera is panned can be identified by referring to an arrow C, based on the correlation of the frame i and adjacent frames.

In FIG. 4B, the image for frame i+k is shown. In FIG. 4B also, the front-space video is formed in the target area 20 in the direction of movement of the soccer player 16, and the direction in which the camera is panned is indicated by an arrow D. In FIG. 4c, the halted image of the soccer player 16 is shown, and in this case the panning velocity of the camera relative to the image is zero.

An estimate of the camera operation based on the video image will now be more specifically explained. The camera operation can be detected by locating on the full screen a group of motion vectors applying to the object in the video image. The motion data for an object is generally provided as a motion vector that is regulated by the shifting of a feature point between adjacent frames. In this embodiment, spatiotemporal image processing can also be employed, regardless of which image format is used. However, in the embodiment of the invention, a method is employed whereby a motion vector is used that can easily provide satisfactory accuracy and that is detected based on the applicable use of MPEG motion compensation data.

In this case, strictly speaking, it is difficult to use MPEG motion compensation vectors to reproduce camera operations; however, since the hardware and the method therefor have already established, for this invention, MPEG motion compensation vectors can be appropriately employed to designate a target area. Camera operation normally involves panning, tilting or zooming, and rolling or translational movement is substantially not performed. Further, generally the rotary shaft and the center of the lens do not match. Thus, the translational movement element does not appear at all during rotation, and even if it should appear, its value is generally considerably smaller than is that of the distance to the object. Thus, in this invention, the translational movement element approximates zero.

In this invention, the parameters of camera operations can be estimated from the motion vector of an object in each of adjacent frames. In this case, an average movement is calculated for motion vectors between adjacent frames in order to provide increased precision and to smooth out the operation of a camera. Then, since an average movement is obtained, an accurate estimate of the camera operation can be acquired, and a target area can be identified based on information concerning the operation of the camera.

In this invention, the above obtained camera operation is employed for the preparation of estimates for the position, in an image, of an object that a cameraman aims at. When a camera is panned slowly, e.g., when the soccer player 16, the object, is halted, as is shown in FIG. 4C, it can be estimated that the object will be positioned near the center of the image. However, when the camera is panned rapidly, as in FIGS. 4A and 4B, the camera is so operated that a front-space video is formed in the direction of movement of the soccer player 16, the object. In this case, it is ascertained that the target area is shifted away from the center in a direction opposite to that in which the camera is panned. Further, the operation of the camera should be performed at a velocity or an acceleration speed equal to or higher than a predetermined threshold value if a necessary front-space video is to be formed. In this invention, the velocity or the acceleration speed can be the unit of the pixel moving speed or acceleration speed either by the hour unit or by the frame unit.

To reverse the panning direction of the camera, since sudden reversals during the operation of a camera should be avoided to the extent possible, is the object moves suddenly, the camera follows the object after a delay of from 200 to 300 ms. While taking this time lag into account, the motion vector of the object should be corrected by tracking the video time series backward 10 frames.

The above processing can be used to formulate a rule by changing the parameters of the camera operation, and estimating the position in a predetermined area wherein the front-space video, including the object, is positioned. In this invention, an area adjacent to the front-space video including the object is defined as a target area. In this invention, an estimate for a target area is has been made, this area, including the object, is trimmed and enlarged, or between the target area and another area the amount of code is changed, so that the scalable coding can be performed.

During the process for extracting, from a video image, a predetermined target area that includes an object, it is generally difficult for the meaning of a stream of video images to be understood merely by extracting a designated object. Therefore, in this invention, a predetermined target area, including an object, is defined as an area, that is equal to or smaller than half of a full screen. In this case, the target area should at least include the object, and can be extracted in any shape from the video image. Further, when scalable coding is employed for this invention, a target area can be defined that is smaller than one half a full screen.

Figure 5:
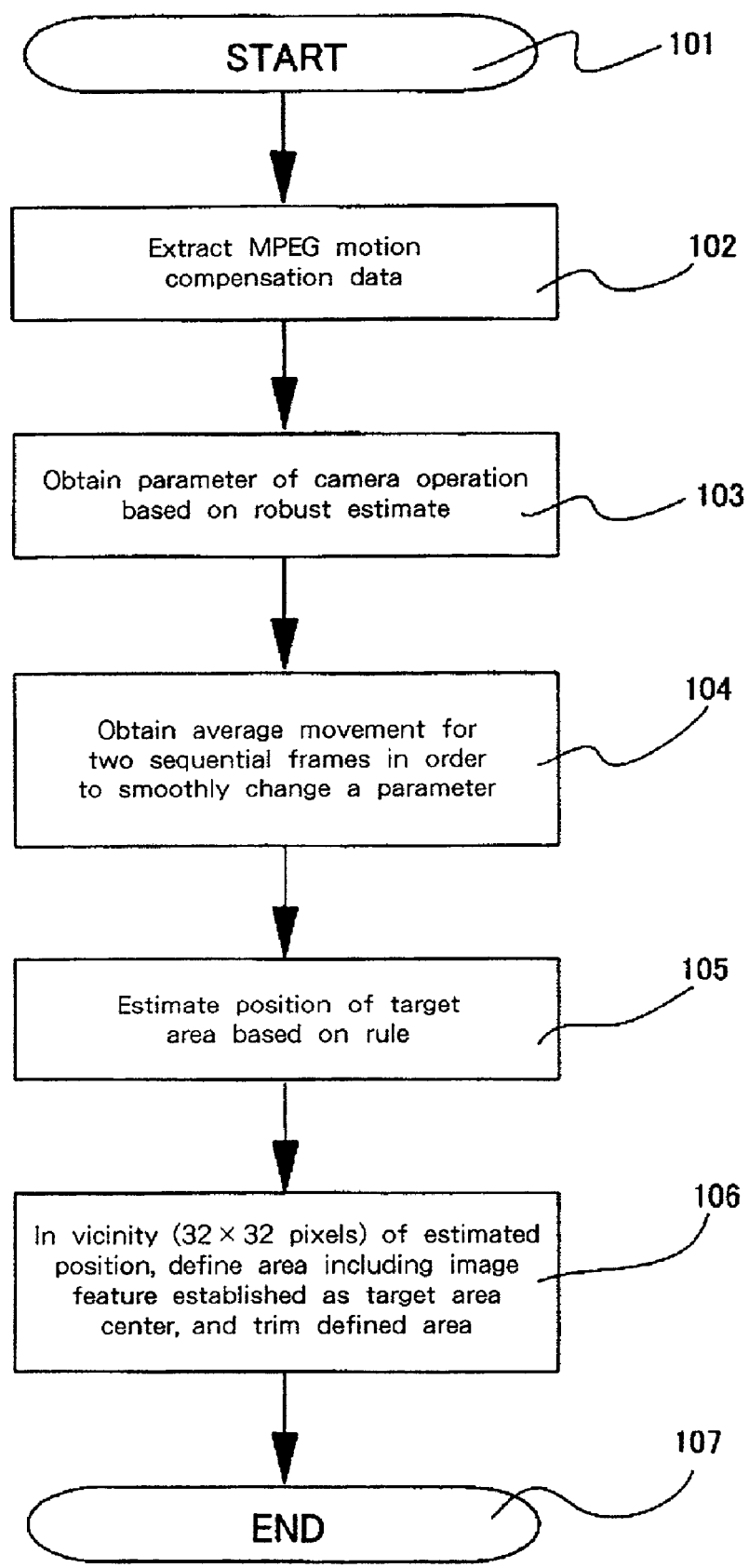
FIG. 5 is a schematic flowchart for the image region segment extraction method of the invention.

FIG. 5 shows an example of a flowchart for the processing performed for the image region segment extraction method of this invention. As is shown in FIG. 5, this processing is initiated at step 101, and at step 102 MPEG motion compensation data is calculated. The processing used to calculate the MPEG motion compensation data is schematically performed in the following manner.

When the MPEG motion compensation data is used to extract the camera operations from an input video, individual points between images in adjacent frames are approximated by using eight parameters in equation (1).

[Equation 1]  (1)

$$\begin{pmatrix} x^{prime} \\ y^{prime} \end{pmatrix} = \begin{pmatrix} \dfrac{f_1(x, y) + r_1}{g(x, y) + 1} \\ \dfrac{f_2(x, y) + r_2}{g(x, y) + 1} \end{pmatrix}$$

In equation (1), for example, $x^{prime}$ and $y^{prime}$ are the locations of predetermined points in the image in frame i+k, and x and y are the locations of predetermined points in the image in frame i.

The relationship existing between $x^{prime}$, $y^{prime}$, x and y in equation (1) is represented by equation (2), while the displacements in frames i and i+1 are defined as $\Delta x$ and $\Delta y$.

[Equation 2]

$$x^{prime}=x+\Delta x$$

$$y^{prime}=y+\Delta y \quad (2)$$

In equation (1), functions $f_1(x, y)$, $f_2(x, y)$ and $g(x, y)$ correspond to rotational movement and translational movement, and are represented by equation (3) using constants $r_{1x}$, $r_{1y}$, $r_{2x}$, $r_{2y}$, $r_x$ and $r_y$, which correspond to the rotational movement and the translational movement.

[Equation 3]

$$f_1(x, y) = r_{1x}x + r_{1y}y,$$

$$f_2(x, y) = r_{2x}x + r_{2y}y,$$

$$g(x, y) = r_x x + r_y y \quad (3)$$

In this invention, while camera operation can be estimated by directly using equations (1) to (3), an estimate performed for the parameters using equation (1) by employing the most likely method corresponds to a non-linear optimization process. Therefore, in the invention, as an easier method, the individual points in images in adjacent frames can be approximated by using a 2D affine transformation that is represented by equation (4).

[Equation 4] (4)

$$\begin{pmatrix} x^{prime} \\ y^{prime} \end{pmatrix} = \begin{pmatrix} a_1 & a_2 & a_3 \\ a_4 & a_5 & a_6 \end{pmatrix} \begin{pmatrix} x \\ y \\ 1 \end{pmatrix}$$

In equation (4), $a_1$ to $a_6$ are constants that correspond to rotational movement and translational movement, and x, y, $x^{prime}$ and $y^{prime}$ indicate the displacement of a predetermined point in an image in frame i and frame i+k. A value of "1" is an Arabic numeral representing the translational displacement, movement, and this approximation is satisfactory when there is a large distance between the object and the camera. In this invention, when MPEG motion compensation data is calculated by using equation (4), linear calculations should be performed for the parameter estimate, and computer resources can be saved.

At step 103, the MPEG motion compensation data obtained at step 102 is obtained to perform a robust estimation process for the camera operation. A robust estimation process includes a step of calculating the square sum for the difference between a point obtained by a pertinent parameter and a point in a video image, removing, based on the parameter estimate, a motion compensation vector that is much farther removed from the center value of the square sum, and performing a recalculation. That is, a robust estimate is repetitively performed several times, so that it fits the square sum of the motion parameter of the camera operation in order to reproduce the MPEG motion compensation data. As a result, the camera operations, such as panning, tilting and zooming, can be determined.

Following this, at step 104, the smoothing of the robust estimate is performed. For the smoothing, the average movement is calculated for the robust estimation results for adjacent frames. When the panning of the camera fluctuates greatly, the adequate estimate may not be performed. However, since the actual camera operations substantially progress smoothly, it is assumed that only the average movement for two sequential frames need be obtained to perform the smoothing for the robust estimation results. It should be noted that any smoothing method can be employed for this invention.

In the flowchart in FIG. 5, at step 105 a rule is applied for the estimation of the position of a target area. A predetermined condition that is related to camera operations is used to prepare a target area estimate, i.e., a rule, can be substantially provided as follows.

Rules for Target Area Estimate

Rule 1: When the movement of a camera is substantially zero, and when the magnitude of a motion vector that is estimated for the video camera within the immediately following ten frames is equal to or smaller than a predetermined threshold value (scalar value), for an object that should be included in a target area, the center of the target area corresponds to the center (0, 0) of the video image.

The example for rule 1 can be a video image in FIG. 4C. This is because, in FIG. 4C, the object included in the target area is halted, the camera operation for forming a front-space video is not employed, and the cameraman tries to arrange the object as near as possible in the center of the image.

Rule 2: When the motion vector of the camera includes a the scalar value equal to or greater than a predetermined threshold value, and when the direction of the motion vector for the object is not greatly changed by referring to the MPEG motion compensation vectors within the immediately preceding and following ten frames, the camera is panned in consonance with the shifting of the object in order to prepare a front-space video. Therefore, the point to which the object is returned from the image center (0, 0), in a direction opposite to that of the motion vector for the camera, a distance equivalent to the scalar value of the motion vector for the camera is designated as the center of the target area, and a window is generated for identifying the target area. It should be noted that the center of the target area should be so determined that the frame of the window does not extend out away from the image.

Figure 6:
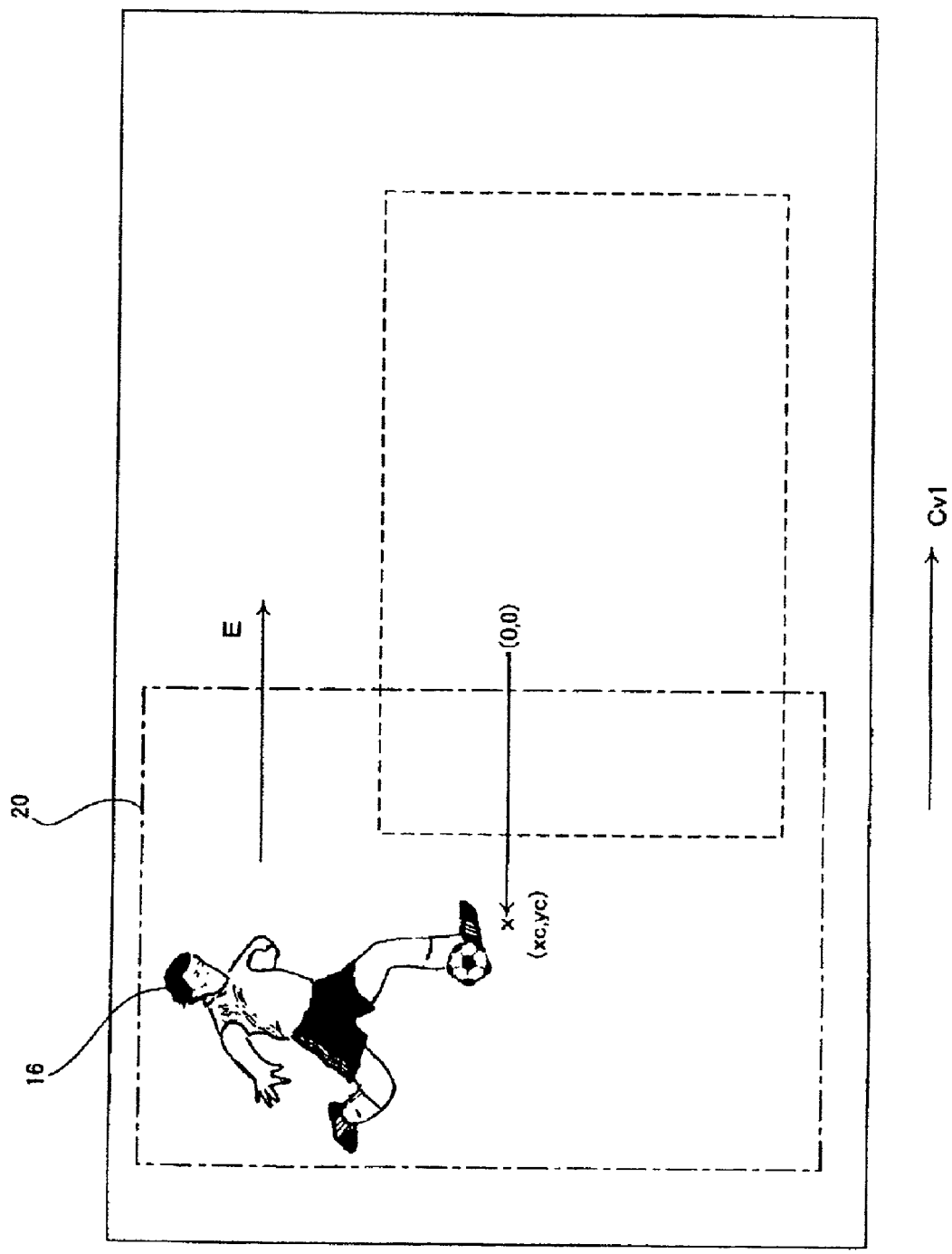
FIG. 6 is a diagram showing the relationship between an object and camera operations when rule 2 is applied.

FIG. 6 shows an example of a diagram specifically prepared as an illustration for rule 2. In FIG. 6, the object, the soccer player 16, is moving in the direction indicated by an arrow E, and the motion vector for a camera that is generated by the operation of the camera by the cameraman is denoted by Cv1, so that in accordance with the movement of the object a front-space video is generated. In the embodiment shown in FIG. 6, the target area 20 is identified while assuming that the scalar value originating at the center (0, 0) of the video image is the same as Cv1, and the position in the opposite direction is the center ($x_c$, $y_c$) of the target area 20. At this time, it is advantageous that the motion vector be normalized for the frame of a video image, i.e., that when the object is returned in the direction opposite to that of the motion vector the center of the target area 20 may not be positioned at a location outside the video image. The center $y_c$ in the direction y can be variously set for the case shown in FIG. 6. In this invention, the center point can be defined in the above manner based on the direction in which the video camera 14 is panned or can be defined as the middle position in the perpendicular direction of the video image, or can be determined under another appropriate condition.

Rule 3: When the motion vector of a video camera includes a scalar value equal to or greater than a predetermined threshold value, and when within the following ten frames, there is a great directional change in the motion vector of the video camera, i.e., an acceleration speed equal to or greater than the threshold value, the object included in the target area changes the direction of the movement, and a cameraman, to generate a front-space video, follows the movement. In this case, while taking into account the time lag for of the camera operation, the sum of the current motion vector and the motion vector after the following ten frames is obtained to designate the motion vector Cv2 for the camera, and the center of the target area 20 is designated in a manner that will be described later.

Figure 7:
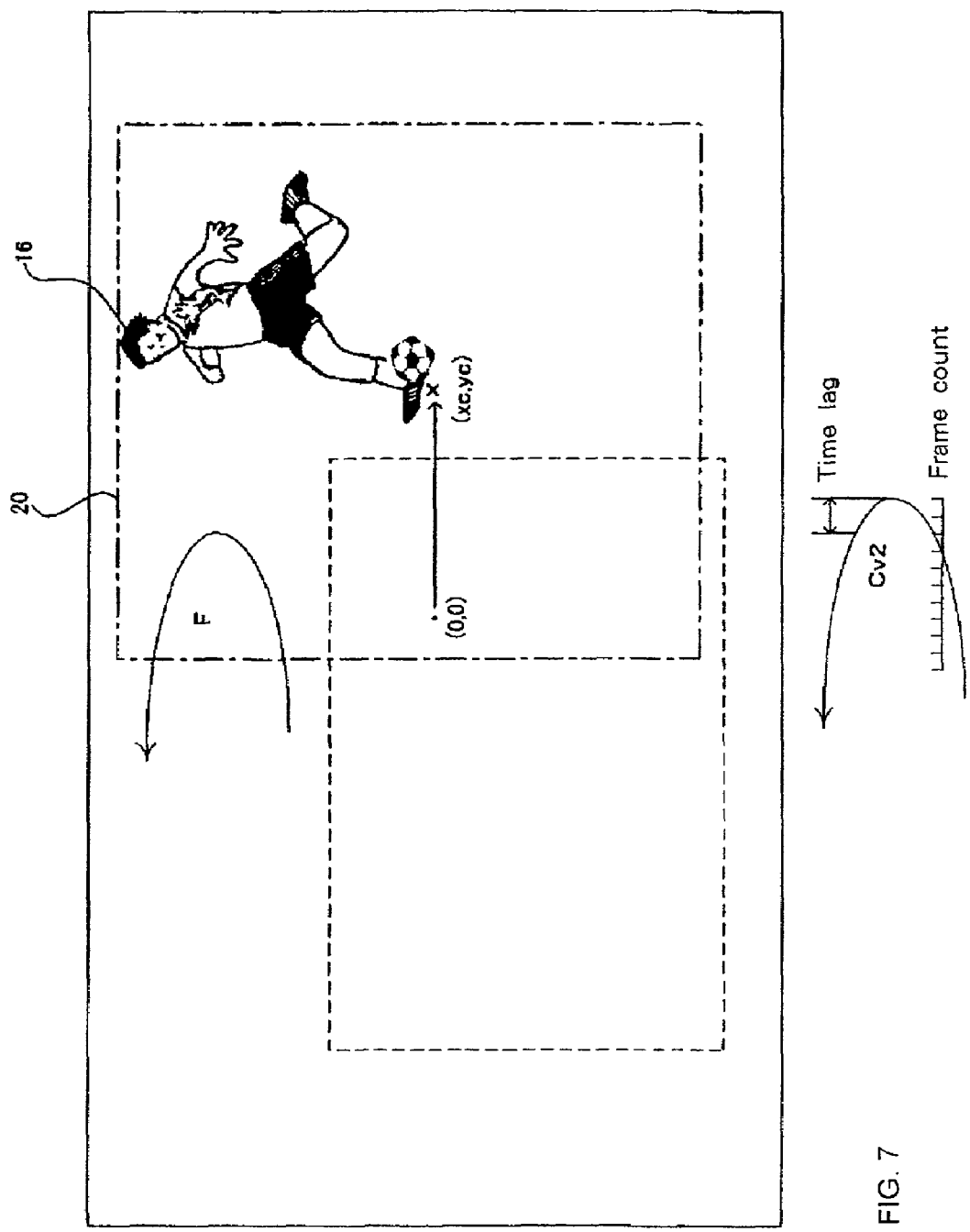
FIG. 7 is a diagram showing the relationship between an object and camera operations when rules 2 and 3 are applied.

This process is specifically shown in FIG. 7. In FIG. 7, a motion vector Cv2 is shown that is estimated when the soccer player 16 changes directions, as indicated by an arrow F, and in accordance with this movement, the cameraman performs the camera operation required for the generation of a front-space video. The center ($x_c$, $y_c$) of the target area can be designated as a position farther from the image center (0, 0) by a distance equivalent to the time lag that occurs before the movement of the object can not caught up with.

Rule 4: When the motion vector for the camera includes a scalar value equal to or greater than a threshold value, and when within the preceding ten frames, an acceleration occurred equal to or greater than a threshold value, the camera operation is that performed after the movement of the object changed, and in this case, the transverse center of the target area can be set by using equation (5).

[Equation 5]

$$x_0 = \text{motion vector} * (10 - \text{the number of frames following a change point})/10 \quad (5)$$

According to the present invention, the center of the target area is estimated from the motion vector for the camera based on the above described four rules. FIG. 8 shows an example of a diagram in which pseudocode is used for the designation of the center of the target area determined at step 104 in accordance with the above rules. In the pseudocode in FIG. 8, the result obtained for the estimate for the center of the target area is represented by ($x_c$, $y_c$), and the center of the video image is represented by (0, 0). Further, in FIG. 8, the pseudocode "define near_zero" defines the threshold value used for determining that the motion vector of the camera near zero. In the pseudocode in FIG. 8, a value of three pixels, for example, is input, and then, the pseudocode "define no_acc" defines a threshold value for determining that the acceleration of the camera is also near zero. In the example in FIG. 8, a value of five pixels can be employed.

In addition, in FIG. 8, the pseudocode "define acc_F" defines a threshold value for determining that a great acceleration change occurred within the ten frames following frame n. In FIG. 8, acc_F is set equal to 10 pixels. Further, in the pseudocode "define acc_B", a threshold value is defined for determining whether a great acceleration change has occurred in the ten frames preceding frame n. Whether the value of the motion vector for the camera is large can be determined by examining the threshold value thresh, and in FIG. 8, a threshold value of five pixels is set for the pseudocode "define thresh". In the pseudocode in FIG. 8, Δx[ ] and Δy[ ] denote the x element and y element of the motion vector for a camera, and "scalar" denotes the magnitude (the scalar value) of the motion vector.

For the pseudocode in FIG. 8, the above values are input, and the scalar value "scalar" for the motion vector is calculated. Then, in block A, a check is performed to determine whether the application of rule 1 is true in the ten frames succeeding frame n. When the determination is true, the center of the video image is determined to be the center of the target area. When the determination is false, in block B rule 2, rule 3 and rule 4 are applied.

In block B, in the pseudocode in FIG. 8, whether rules 3 and 4 are applied is determined by whether the motion vector for the camera is equal to or greater than a threshold value, and the center of the target area is determined. In the other case, rule 2 is applied, and the center (xc, yc) of the target area is determined to be (−Δx[n], −Δy[n]).

In any other case, i.e., when no rule is employed, in block C of the pseudocode in FIG. 8, the center of the target area is determined by using the average of the ten frames preceding and following frame n. These values are examples, and any other value can be used as needed for this invention.

The image region segment extraction method of the invention will be described again while referring to FIG. 5. At step 106, the pixel that represents the image feature of the actual object is searched for within a range of, for example, 32×32 pixels from the center (xc, yc) of the target area that is thus determined. The position of the pixel that represents the image feature and that is found in this range is determined and is established as the center of the target area. For this process, various references can be employed; for example, either the portion wherein the image features are the most concentrated can be determined to be the center of the target area or the pixel that is the nearest to the center of the estimated target area can be selected, or these methods can be jointly used.

The target area is trimmed from the center obtained at step 106 to provide a size equal to or smaller than half of the entire image, and the image segment that includes the target area is extracted. At step 107, the image region segment extraction method of this invention is terminated.

Figure 9:
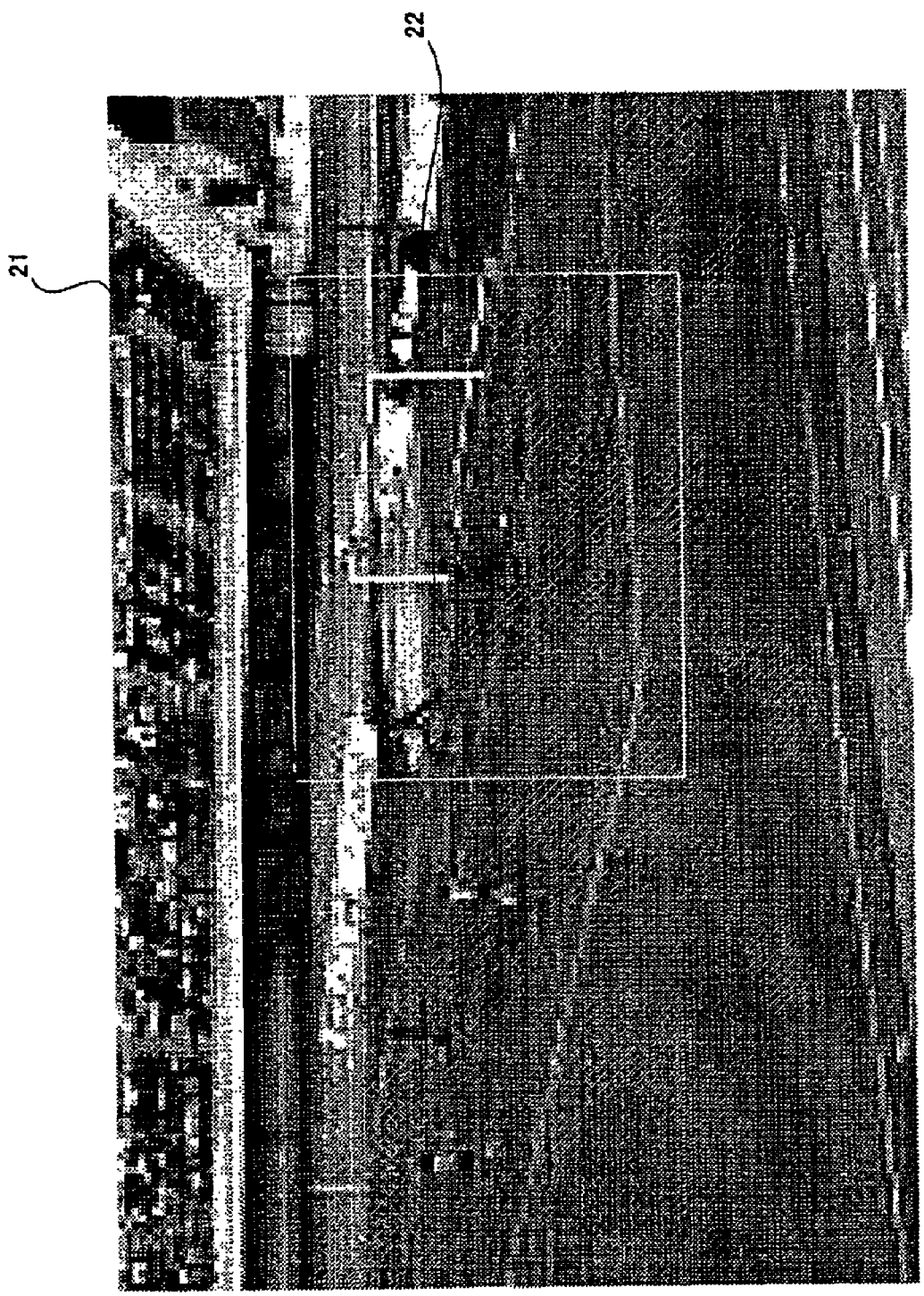
FIG. 9 is a diagram showing a trimming example wherein the target area according to the embodiment is included.

FIG. 9 shows an example of a diagram showing a trimming example, including the target area 20 extracted by the image region segment extraction system of this invention. In FIG. 9, in the target area 20 in an image 21 before trimming, the soccer player 16 is moving forward toward the goal while retaining control of the ball. However, the target area 20 occupies only a small portion of the entire image, and when this area 20 is presented on the liquid crystal display of a cellular phone, for example, this area 20 may not be identified.

Figure 10:
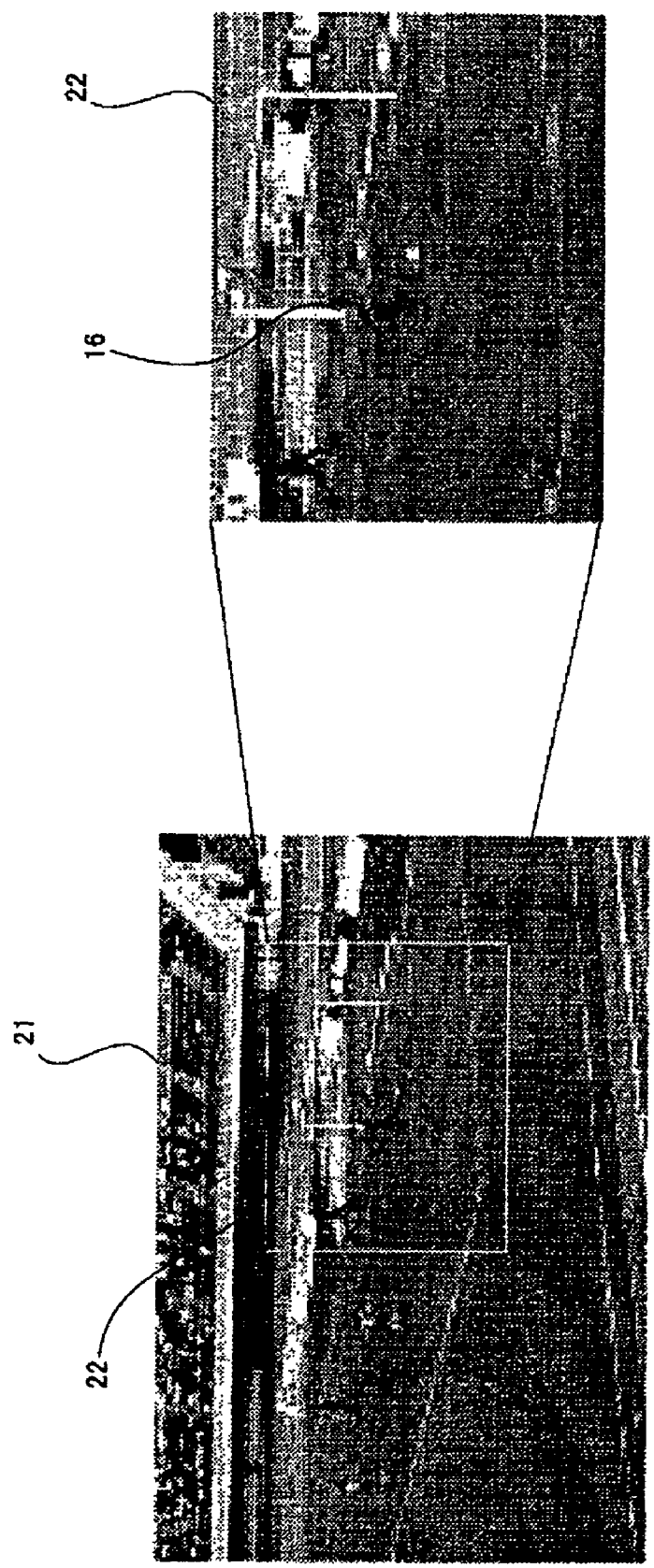
FIG. 10 is a diagram showing an image obtained by the trimming performed in accordance with the invention.

FIG. 10 shows an example of a diagram showing the image 21 in FIG. 9 before trimming, and an image 22 obtained by extracting from the image 21 an image region segment, which includes the target area 20, that is then trimmed. As is shown in FIG. 10, the trimmed image 22 is generated so that it includes the target area 20, and so that its size is equal to or smaller than half of the full screen. Further, in this invention, a trimmed image 22 can be generated that in size is appropriate for the liquid crystal display of a cellular phone.

According to the invention, when trimmed digital content is to be generated for an original video, the trimming process is performed for sequential frames to obtain a series of sequential trimmed images 22 along the time axis. Then, to generate the trimmed digital content, the trimmed images 22 are arranged in the same order as are the frames in the original video. The thus obtained digital content can then be stored, using appropriate storage means, for subsequent distribution to portable terminals.

Figure 11:
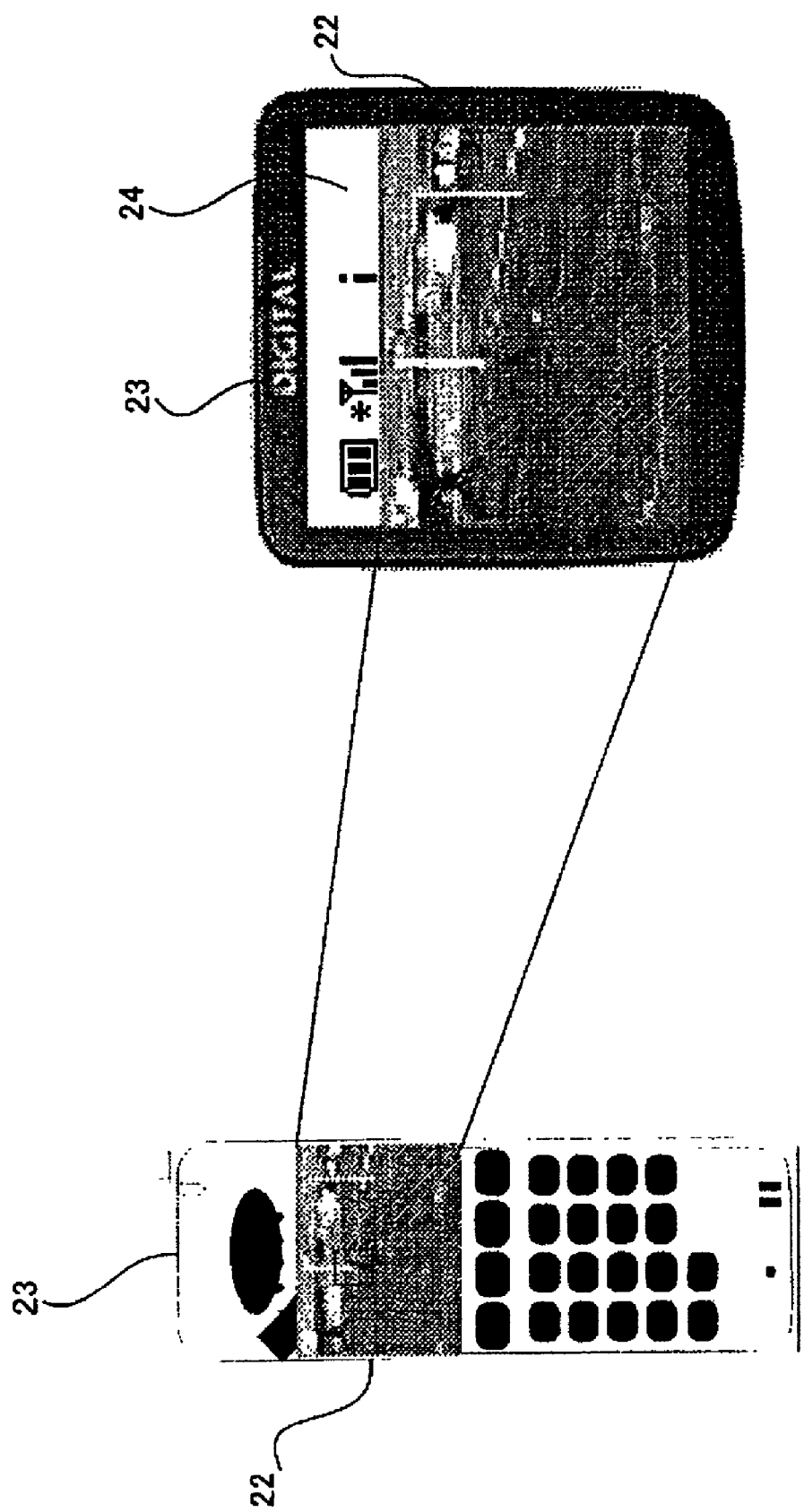
FIG. 11 is a diagram showing the state in the invention when a trimmed image is displayed on a cellular phone.

FIG. 11 shows an example of a diagram showing the state wherein the trimmed image 22 is displayed on the liquid crystal display 24 of a cellular phone 23. As is shown in FIG. 11, according to the invention, the image can be trimmed to a size appropriate for the liquid crystal display 24 of the cellular phone 23, and can be distributed as digital content via a network, such as the Internet.

Figure 12:
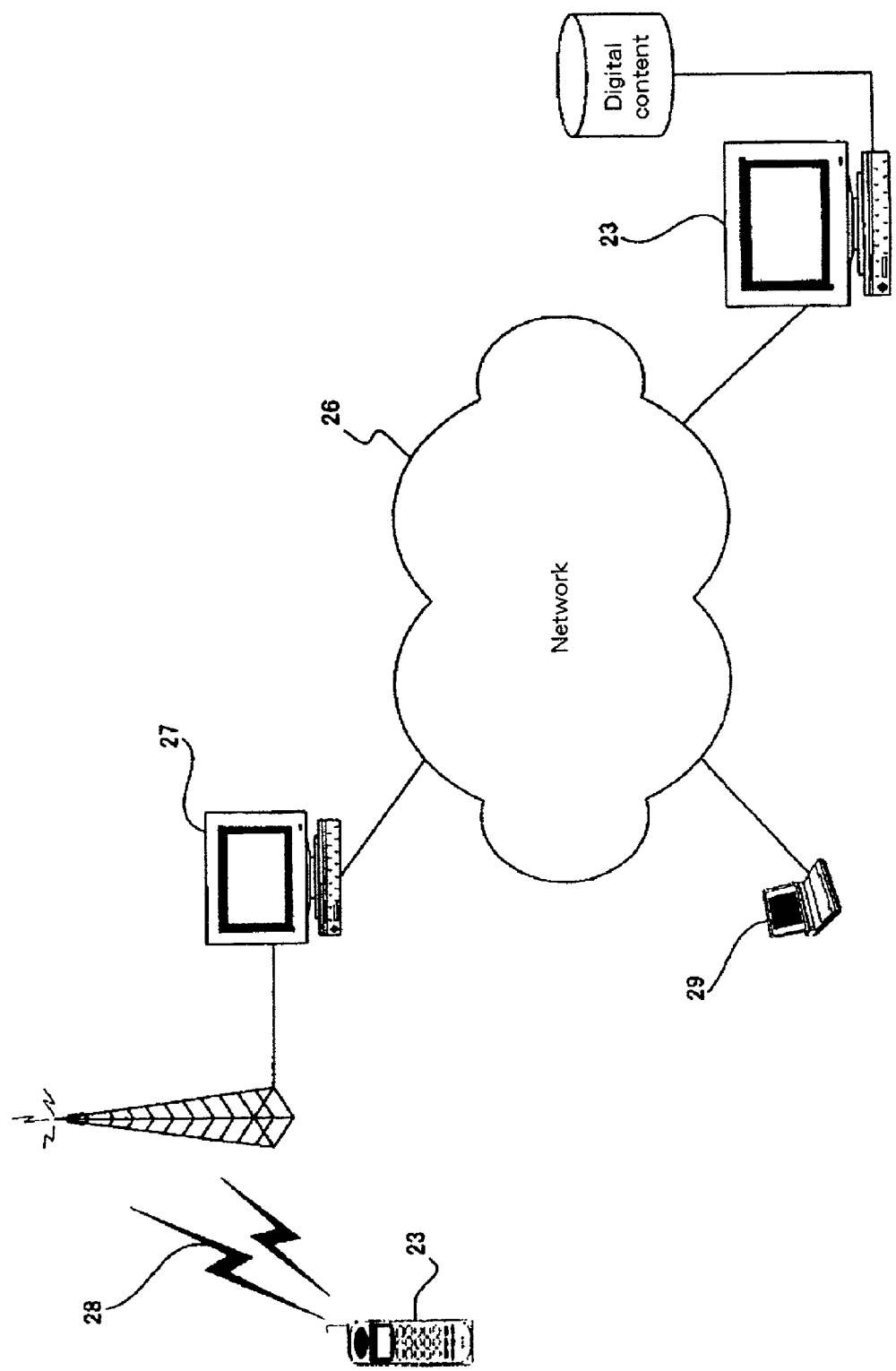
FIG. 12 is a diagram showing a system used for the distribution of video images extracted in accordance with the invention.

FIG. 12 shows an example of a diagram showing a system used for the distribution to the cellular phone 23 of the trimmed image 22 that is generated by the invention. In the system in FIG. 12, a server 25, whereat the trimmed image 22 extracted using the image region segment extraction method of the invention is stored, is connected to a network 26, such as the Internet, as is a carrier server 27, which provides an Internet connection service for the cellular phone 23. To provide the Internet connection service, the carrier server 27 communicates with the cellular phone 23 via a second network 28, such as a radio network. The image region segment extraction system of the invention may be used either for the server 25 that stores the trimmed image 22, or another computer may be employed that only stores trimmed images in the storage means.

The network 26 of the invention can be the Internet; however, other networks can be employed so long as the information can be exchanged at a remote area by an optical communication network or another communication network, such as a LAN or WAN, using an appropriate communication protocol. The communication protocol can be, but is not limited to, TCP/IP, for example.

An arbitrary cellular phone 23 can be used for the invention so long as it can provide the Internet connection service. The cellular phone 23 can be, for example, an i-mode (a trademark) cellular phone, a sky mail (a trademark) cellular phone or a cellular phone that uses EZweb; however, the cellular phone used in this invention is not limited to these listed phones. Further, the content can be distributed not only by the cellular phone 23 but also by a portable terminal, such as a mobile computer 29.

An explanation will now be given for the process for distributing the content using the system in FIG. 12. When content generated by the invention is to be provided for the cellular phone 23, via the Internet, to receive the service, the user of the cellular phone 23 should register with a content provider who provides the trimmed image 22. At this time, the user should access the server 25 via the carrier server 27, and obtain from the provider a user ID and a key, which serves as a password. Then, to receive content, the user transmits to the carrier server 27 a content request that includes the user ID and the password. Thereafter, the carrier server 27 transmits the content request to the address of the URL site of the content provider specified in the content request.

Upon receiving the content request, via the carrier server 27, the server 25, which stores trimmed images, searches storage means, such as a database that is provided, for the content specified in the content request, and subsequently provides the content for the cellular phone 23 via the network 26, the carrier server 27 and the network 28. For this purpose, any well known session management method can be employed. In this case, the user of the cellular phone 23 that receives the requested digital content may be charged on line or off line for the digital content distribution service.

As is described above, according to the invention, the image region segment extraction method for a video image, the image region segment extraction system, the program for extracting an image region segment, the method for distributing an extracted video image, and a content generation method can be provided, and content, such as sports and news digests, can be distributed to portable terminals without deterioration of image quality. But while news content does not include much movement, objects in sport content move rapidly, and because players and balls move frequently they can not easily be identified when high compression coding, such as MPEG-4, is used alone. However, although compression rates can not be increased because of limitations imposed by bandwidths, in accordance with this invention target areas can be designated and enlarged, so that obtained targets can be transmitted using MPEG-4 compression, or can be used as images for which scalable coding is employed.

An explanation for the present invention has been given by describing the embodiment while referring to the accompanying drawings and specific numerical values. It should be noted, however, that this invention is not limited to the embodiment presented in the explanation, and can be variously applied, so long as the effects of the invention can be obtained.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. An image region segment extraction method comprising extracting an image segment from a video image, extracting only said target area being one of an area aimed at by a cameraman and an essential portion of the video image, and either enlarging an image sequence of said target area, or increasing a resolution only of the target area while high compression scalable coding is performed for other portions of said video image, the step of extracting comprising the steps of:

calculating motion data for a video image based on two sequential frames of video images obtained by a video camera;

using said sequential video images to estimate the camera operations required of said video camera;

referring to said camera operations performed under predetermined conditions to estimate the location of the center of a target area in a video image that has been obtained;

designating image features in the vicinity of said center position of said target area;

designating an image segment in which said image features are included;

extracting said target area being one of: an area aimed at by a cameraman and an essential portion of the video image, and either enlarging an image sequence of said target area, or increasing a resolution only of the target area while performing high compression scalable coding for other portions of said video image, wherein said video image is selected from a format taken from a group of formats including: an MPEG format, a CGM format, an EPS format, a GIF format, a JPEG format, a PICT format, a PNG format, a PS format, a TIF format or a BMP format;

wherein said step of calculating said camera operations includes the step of:

making an estimation of the robustness of a predetermined parameter of said camera operations, so as to perform a robust estimation process for the camera operation to enable determination of camera operations, such as panning, tilting and zooming;

further comprising a steps of:

obtaining an average movement for said predetermined parameter for two sequential frames;

wherein, at said step of estimating said center position of said target area, a rule is employed concerning front-space video in said camera operations;

at least one of: trimming said image segment and generating a trimmed image, and performing scalable coding to obtain a high resolution for said image segment.

2. The image region segment extraction method according to claim 1, further comprising the step of:

generating content, including trimmed images or scalable coded images, the step of generating content comprising the steps of:

generating one of trimmed images or scalable coded images;

arranging said trimmed images or scalable coded images in an order occupied by video images before trimming to constitute a continuous content time series; and storing said content in a storage media.

3. The image region segment extraction method according to claim 2, further comprising the step of employing an article of manufacture comprising a computer usable medium having computer readable program code means embodied therein for causing generation of content, the computer readable program code means in said article of manufacture comprising computer readable program code means for causing a computer to effect the steps of calculating; using; referring; designating image features; designating an image segment; trimming or performing; and generating content.

4. The image region segment extraction method according to claim 1, further comprising the step of employing an article of manufacture comprising a computer usable medium having computer readable program code means embodied therein for causing extraction of an image segment from the video image, the computer readable program code means in said article of manufacture comprising computer readable program code means for causing a computer to effect the steps of calculating; using; referring; designating image features; and designating an image segment.

* * * * *